United States Patent Office 3,272,760
Patented Sept. 13, 1966

3,272,760
DEHYDROCYCLIZATION CATALYSTS
Louis C. Doelp, Jr., Glen Mills, Pa., assignor to Air Products and Chemicals Inc., Philadelphia, Pa., a corporation of Delaware
No Drawing. Filed Feb. 5, 1963, Ser. No. 256,245
4 Claims. (Cl. 252—465)

The present invention relates to improved dehydrocyclization catalysts particularly useful in the cyclization of open chain alkanes into closed chain or aromatic hydrocarbons.

The commercial importance of aromatic hydrocarbons has been increasing in recent years. Although large quantities of aromatics are currently produced by coal distillation and especially by the hydroforming of petroleum naphthas, the demand for certain aromatics still exceeds the supply.

Aside from the aromatic hydrocarbons obtained as byproducts from the distillation of coal, there are several ways, all of which have been studied in considerable detail, of producing aromatic hydrocarbons from petroleum hydrocarbons. It is known, for example, that aromatic hydrocarbons may be produced from non-aromatic petroleum hydrocarbons under severe thermal cracking conditions. This method, however, is generally impractical for the production of pure aromatic hydrocarbons and has the concomitant disadvantage of low yields.

It is also known that aromatic hydrocarbons may be produced by the thermal treatment of light hydrocarbon gases at high temperatures according to the Fischer process. This process, however, requires temperatures in the neighborhood of 1830° F. to 2370° F. and the use of a large number of expensive alloy reaction tubes of extremely small dimensions.

In the realm of practical procedures, it has been found that aromatic hydrocarbons may be synthesized by the catalytic cyclization-dehydrogenation of open chain hydrocarbons. This procedure allows aromatic hydrocarbons to be produced in good yields from relatively inexpensive and readily available hydrocarbons. Thus, alkanes which, in view of their poor octane number, are least desirable for gasoline-type fuels may advantageously be utilized to obtain aromatic hydrocarbons.

Dehydrocyclization catalysts are evaluated by a criteria which include the (1) aromatic yield, (2) aromatic selectivity, and (3) amount of coking obtained by using the catalysts. Accordingly, the production of aromatic hydrocarbons by cyclization requires catalysts having dehydrogenating activity. It is known, however, that the cyclization ability of a given catalyst involves more than simply its dehydrogenating ability. Although considerable investigation has been made with respect to the possible cyclization activity of nearly all classes of dehydrogenating catalysts, only a relatively few have been found to exert an appreciable cyclization activity.

It is an object of the present invention to provide improved dehydrocyclization catalysts.

It is a further object of the invention to provide a method for preparing dehydrocyclization catalysts which results in a high aromatic yield with high aromatic selectivity and low coking.

In general, the improved catalysts, according to the present invention, are prepared by a series of steps which preferably include as the first step the mixing of alumina trihydrate with a binder. This mix is extruded, molded or nodulized and then dried. The material is then impregnated to incorporate chromia and dried. After further heat treatment, the material is finally impregnated to incorporate platinum, dried and air calcined.

The alumina trihydrate employed as a starting material is preferably beta alumina trihydrate obtained by a method such as described in my copending application, Serial Number 854,271, filed November 20, 1959, now U.S. Patent Number 3,092,454. Other absorptive alumina carrier material, such as the various modifications included under the general designation "gamma alumina," may be employed with the beta alumina trihydrate.

In the preferred practice of the present invention, alumina trihydrate in the form of fine powder is impregnated with a binder such as nitric acid. The nitric acid content of the impregnated powder is controlled within the range of 5 to 9%, preferably 6 to 8% and desirably 7%, based on 100% nitric acid. It is generally desirable to use an aqueous solution of nitric acid, but because the weight of the diluting water is less than the weight of the commercial acid employed, the solution is generally designated as concentrated acid. The alumina trihydrate and acid are reacted until a minor amount of aluminum nitrate forms throughout the alumina trihydrate. The time necessary for effective completion of the reaction is generally more than one hour at the temperatures usually encountered, but may, at higher temperatures, be somewhat less than one hour.

After mixing, up to 15% (on $Al_2O_3$ basis) powdered aluminum may be added to the mix. Approximately 1 to 30 minutes of additional mixing is necessary to incorporate this powdered aluminum.

The mix, with or without the inclusion of powdered aluminum, is then transferred, by suitable means, such as a vibrating feeder, to an extruding machine. Rods of extruded material are sliced into pellets. These pellets, immediately after extrusion, and before drying, are so free from moisture that they can slide down an inclined chute without sticking to each other and can be handled in a shallow gravitating bed without aggregation or cohesion.

The initial drying of the freshly extruded pellets is carefully controlled in order to prevent the development of large crytallites of aluminum salt within each pellet. Typically, the pellets are subjected for about 1 to 2 hours to a dry gas stream maintained at a temperature above 220° F. and below 300° F., preferably about 270° F. Except for the water necessary for the hydrates of the components, this first stage of drying removes substantially all of the water thus bringing about a further non-adhesiveness of the pellets.

Following the initial drying, the pellets are subjected to a temperature of about 600° F. to remove most of the hydrate water. This heating also decomposes much of the nitrate anion of the aluminum nitrate salt, thus forming alumina from the aluminum nitrate distributed throughout the pellet. The temperature is raised from about 270° F. to about 600° F. at a slow rate during a period of several hours. As the pellet is raised in temperature from 400° F. to 600° F. and desirably during most of the heating from 300° F. to 600° F., high humidity conditions are maintained so that the volume concentration of steam is at least 50%. The humidity is controlled in part by passing an auxiliary gas stream at low space rate through the pellets being heated from 400° F. to 600° F. Some steam is evolved by the decomposition of the hydrate and is allowed to escape so slowly as to maintain the 50% humidity conditions.

In addition to this dehydration treatment the pellets are further subjected to an inert atmosphere which is preferably about 800° F. to 1700° F.

Assuming chromic acid has not been used as the binder, impregnation to incorporate chromia is accomplished by solution impregnation of the pellets using a "no excess solution" technique which has also been referred to as the capacity absorption technique. The impregnating solutions may be prepared with either water or alcohol or mixtures thereof together with chromic oxide or a soluble chromium salt. The impregnation is continued until good distribution of 0.1 to 2% of the chromium compound in the pellets is obtained. The amount of impregnating solution, however, is carefully controlled by a practice designated as the capacity absorption or no excess solution technique. According to this technique a sample of material to be impregnated is tested with respect to the specific amount of liquid which can be absorbed by any unit of the material. This can be determined, for example, by placing a certain amount of the material in water and after a period of time determining the exact proportion of water absorption. Once this is determined, pellets of the same material are impregnated with only the specific amount of solution which the pellets are potentially capable of absorbing. Thus, all of the impregnating solution is absorbed on the pellets and there is no excess solution remaining outside the pellets upon completion of the impregnation.

The pellets impregnated to incorporate chromia are oven dried for 1 to 4 hours at a temperature above 220° F. and below 260° F., desirably about 240° F. After this drying step, the pellets are once again heat treated at a temperature of at least 900° F., preferably within the range of 1200° F. to about 1600° F. and more particularly at about 1400° F. for 1 to 3 hours. If desired, this heat treatment may be in the presence of an inert atmosphere as nitrogen.

The final pellet impregnation incorporates platinum. While mixtures of platinum and palladium, as well as palladium alone, have also been utilized, the most desirable end results have been obtained using platinum. Preferably this impregnation is accomplished by using chloroplatinic acid but in certain instances other compounds of platinum such as platinum tetrachloride, ammonium platinum chloride, barium platinum cyanide, etc., may be employed. This impregnation is accomplished using the no excess solution technique. The pellets impregnated to incorporated platinum will contain less than 5% but more than 0.2% platinum.

After drying the impregnated pellets in an oven for 1 to 3 hours at a temperature above 220° F. and below 260° F., the pellets are air calcined at a temperature between about 800 and 1100° F. for 3 to 6 hours.

The catalysts prepared as described may be submitted to a pretreatment prior to their actual use in the production of aromatic hydrocarbons from hydrocarbons containing at least six and preferably not more than twelve carbon atoms in an open chain. For example, the catalysts may be heated in the presence of a gas such as hydrogen or hydrogen plus natural gas, etc. This treatment with a hydrogen-containing gas reduces the platinum compounds in the catalyst to platinum. Usually, however, the catalyst is not pretreated in this manner but is placed directly in the reactor since the reduction of the platinum compounds is accomplished by the hydrogen necessary for the start-up of such reactors.

While nitric acid is the preferred binder, any binding material which does not adversely affect the characteristics of the final catalyst such as acetic acid, chromic acid, phosphoric acid, resins, corn oil, water, etc., may be employed.

The pellet form of the catalysts, obtained by the described extrusion technique, is not critical to the present invention. If desired, spherical shapes as well as others may be prepared. For example, the methods disclosed in the copending applications by Lee A. Cosgrove, S.N. 252,040, and by Edward B. Cornelius et al., S.N. 252,041, concurrently filed on January 17, 1963, may be employed for effecting sphere formation. The pellets may also be formed by molding in apparatus such as the Stokes pelletizer.

The preparation of the improved catalysts of this invention is further illustrated by the following specific examples. The dehydrocyclization activity of these catalysts is compared in the examples with catalysts of similar composition and having similar preparation.

*Example I*

Catalysts having the following percentages of platinum and chromium oxide

| Catalyst | Pt | $Cr_2O_3$ |
|---|---|---|
| A | 0.5 | 0.0 |
| B | 0.5 | 2.0 |
| C | 0.5 | 2.0 |
| D | 0.5 | 2.0 | were prepared by separately mixing four batches of beta alumina trihydrate with an aqueous solution consisting of six parts of commercial (67%) nitric acid and one part of water for 30 minutes. The resulting mixes were then extruded through die plates having a diameter of 2.4 mm. and the strands cut into pellets of 4 to 5 mm. in length. These extrudates were dried in an oven using air through circulation at 270° F. for 2 hours.

This initial drying, however, does not remove the water present as a hydrate. Initially, a dehydration temperature of 600° F. was employed for all the pellets. This temperature was then elevated to 800° F. for two hours and then to 900° F. for one hour. While heating at the elevated temperature, D pellets were placed in a nitrogen atmosphere.

Pellets in groups B, C and D received a 2% chrome impregnation using the no excess $CrO_3$–$H_2O$ solution technique and were then oven dried using air through circulation at 270° F. for two hours. This drying step was followed by further heat treatment at 1400° F. for two hours under a nitrogen atmosphere for the pellets that had received a nitrogen dehydration while those that had an air dehydration were heat treated with air. The pellets which where not impregnated with the $CrO_3$–$H_2O$ solution were also heat treated but at only 900° F. with air for two hours instead of 1400° F.

All of the pellets (A–D) were then immediately impregnated with $H_2PtCl_6$ again using the no excess solution technique. The impregnation for pellets in groups A and B was carried out with rehydration under a $CO_2$ atmosphere while the impregnation for pellets in groups C and D was carried out without rehydration and with an air atmosphere over the pellets. All of the pellets were dried in an oven having air through circulation at 270° F. for two hours and then calcined for 4 hours at 900° F.

The bulk density and crushing strength of the thrus prepared catalysts is set forth below.

| Catalyst | Bulk Density (kg./l) | Crushing strength (lbs.) |
|---|---|---|
| A | 0.860 | 23.4 |
| B | 0.836 | 23.5 |
| C | 0.835 | 20.2 |
| D | 0.843 | 24.2 |

*Example II*

To determine the effectiveness of each of the catalysts described in Example I as dehydrocyclization catalysts, each catalyst was employed together with an n-octane feed stock under the following detailed operating conditions:

| | |
|---|---|
| Temperature (° F.) | 940–975 |
| Liquid volume space rate (vol./hr./vol.) | 1.8–2 |
| Pressure (p.s.i.g.) | 150 |
| $H_2$/oil mol ratio | 4–5 |

The yields and selectivities thereby obtained for the respective catalysts are shown by the following table:

| Catalyst | A | B | C | D |
|---|---|---|---|---|
| Aromatic yield (%) | 31.3 | 32.1 | 37.1 | 43.4 |
| Aromatic selectivity (%) | 34.6 | 40.9 | 44.9 | 48.9 |
| Coke at end of run (%) | 7.7 | 2.5 | 3.3 | 3.2 |

It will be seen from the above tables that increasing the $Cr_2O_3$ content of the catalysts from zero to 2% and employing a 1400° F. heat treatment rather than 900° F. increases the aromatic yield as well as aromatic selectivity and decreases the coking. Catalysts A and B afford a direct comparison with respect to those features since their preparation is essentially identical with the exception of the presence or absence of $Cr_2O_3$ impregnation and the increase in temperature of heat treatment employed during the preparation of catalyst B.

It will also be noted that the combination of no rehydration and an air atmosphere in the preparation of catalysts C and D substantially improves the aromatic yield and aromatic selectively of these catalysts as compared to catalysts A and B, which were prepared with rehydration and a $CO_2$ atmosphere during the impregnation with platinum.

Finally, it will be seen by comparison of the results obtained with catalysts C and D that the existence of a nitrogen atmosphere following the initial dehydration of catalyst D (i.e., prior to $CrO_3$ impregnation) significantly increases the aromatic yield and aromatic selectivity of the catalyst while maintaining a good coking resistance.

Thus, catalyst D has not only good crushing strength (Example I but also excellent dehydrocyclization activity.

*Example III*

Catalysts E, F, G, and H having the following percentages of platinum, chromium oxide and aluminum

| Catalyst | Pt | $Cr_2O_3$ | Al |
|---|---|---|---|
| E | 0.5 | 1 | 1 |
| F | 0.5 | 2 | 5 |
| G | 0.5 | 2 | 5 |
| H | 0.5 | 1 | 10 | were prepared by initially mixing beta alumina trihydrate with water and nitric acid in separate batches in the manner set forth in Example I.

After this initial mixing, 1, 5, 5 and 10% (on an $Al_2O_3$ basis) of powdered aluminum was added to the respective batches and mixing was continued for approximately ten minutes. Immediately thereafter the batches were extruded, cut into pellets and oven dried in the manner indicated in Example I. Due to the hardening effect of powdered aluminum on the respective batches, rapid extrusion following mixing is necessary.

To effect dehydration of the pellets, a temperature of 600° F. was employed during the dehydration of all the pellets. After two hours this temperature was raised to 800° F. Batches E and H remained at 800° F. under a nitrogen atmosphere for one hour while batches F and G were left in an air atmosphere at 800° F. for two hours followed by a temperature of 900° F. for one hour.

Next, the pellets were impregnated with $CrO_3$ using the no excess solution technique of Example I. The thus impregnated pellets were dried for two hours at 240° F. for batches E and H and at 270° F. for batches F and G.

Pellets in batch E were then heat treated at 1400° F. in 100% nitrogen for two hours. Pellets in batches F and G were likewise heat treated at 1400° F. for two hours but in air instead of nitrogen. The heat treatment of the pellets in batch H consisted of 2 hours in a nitrogen atmosphere at 900° F.

The pellets were then impregnated with $H_2PtCl_6$, again using the no excess solution technique of Example I. Pellets in batches E, F and H were impregnated without rehydration and without a $CO_2$ atmosphere. The pellets in batch G, on the other hand, were rehydrated prior to impregnation in a $CO_2$ atmosphere.

After 2 hours of oven drying using air through circulation at 240° F. for the pellets of batches E and H and 270° F. for the pellets of batches F and G, the pellets were air calcined at 900° F. for four hours.

The finished catalysts had the following characteristics:

| Catalyst | Bulk Density (kg./l.) | Crushing Strength (lbs.) |
|---|---|---|
| E | 0.79 | 12.8 |
| F | 0.85 | 19.7 |
| G | 0.86 | 17.1 |
| H | 0.70 | 13.6 |

*Example IV*

The effectiveness of the catalysts of Example III for dehydrocyclization was determined employing an n-octane feed stock under the following operating conditions.

Catalysts E and H:
Temperature (° F.) _____ 975–985
Liquid volume space rate (vol./hr./vol.) __ 2–3
Pressure (p.s.i.g.) _____ 150
$H_2$/oil mol ratio _____ 3–5

Catalyst F and G:
Temperature (° F.) _____ 950–960
Liquid volume space rate (vol./hr./vol.) __ 2–2.5
Pressure (p.s.i.g.) _____ 150
$H_2$/oil mol ratio _____ 3.5–4

The yields and selectivities obtained with catalysts E through H in the dehydrocyclization of n-octane under the conditions set forth are shown by the following table:

| Catalyst | E | F | G | H |
|---|---|---|---|---|
| Aromatic Yield (percent) | 49.2 | 31.3 | 26.6 | 45.9 |
| Aromatic Selectivity (percent) | 54.6 | 40.6 | 37.3 | 50.3 |
| Coke at end of run (percent) | 1.2 | 4.1 | 3.8 | 3.1 |

Comparison of the data for catalysts A through D with catalysts E through H indicates that the presence of aluminum in the catalysts results in improved aromatic yield and selectivity of the dehydrogenation-cyclization of alkanes is accomplished at a relatively high temperature.

It will be noted from the above table that catalysts E and H which were placed in a nitrogen atmosphere following initial dehydration resulted in improved aromatic yield and selectivity when compared to the catalysts F and G.

The absence of rehydration and a $CO_2$ atmosphere following the impregnation of platinum in the preparation of catalyst F materially improves the yield and selectivity obtained as shown by analysis of catalysts F and G.

Finally, it can be seen from the data set forth for catalysts E and H that the increase in temperature of 900 to 1400° F. following $CrO$–$H_2O$ impregnation substantially increases the dehydrocyclization activity of the catalysts.

Obviously, many modifications and variations of the invention as hereinbefore set forth may be made without departing from the spirit and scope thereof, and therefore only such limitations should be imposed as are indicated in the appended claims.

What is claimed is:
1. The method of preparing dehydrocyclization catalyst which comprises mixing alumina trihydrate with a binder, forming said mix into pellets, dehydrating the pellets, impregnating said pellets to incorporate 0.1 to 2% chromium, drying the impregnated pellets, further impregnating the pellets to incorporate 0.2 to 5% of a metal selected from the class consisting of platinum, palladium and mixtures thereof and calcining the pellets.

2. The method of preparing dehydrocyclization catalyst which comprises mixing alumina trihydrate with a binder, adding powdered aluminum to the mix, forming said mix into pellets, dehydrating the pellets, impregnating said pellets to incorporate 0.1 to 2% chromium, drying the impregnated pellets, further impregnating the pellets to incorporate 0.2 to 5% of a metal selected from the class consisting of platinum, palladium and mixtures thereof and calcining the pellets.

3. The method of preparing dehydrocyclization catalyst which comprises mixing alumina trihydrate with a binder, forming said mix into pellets, drying the pellets in a dry gas stream at a temperature between 220 and 300° F., increasing the temperature to about 600° F. to effect dehydration, impregnating such pellets with a $CrO_3$ solution in an amount to incorporate therein about 0.1 to 2% $Cr_2O_3$ by weight of the pellets, drying the impregnated pellets at a temperature between 220 and 260° F., further impregnating the pellets to incorporate 0.2 to 5% of a metal selected from the class consisting of platinum, palladium and mixtures thereof, drying the impregnated pellets at a temperature between 220 and 260° F. and air-calcining the pellets.

4. The method of preparing dehydrocyclization catalyst which comprises mixing alumina trihydrate with a binder, adding a minor amount of powdered aluminum to the mix, forming said mix into pellets, drying the pellets at a temperature between 220 and 300° F., increasing the temperature slowly to about 600° F. to effect dehydration, impregnating such pellets with chromic oxide solution to incorporate 0.1 to 2% chromium, drying the impregnated pellets at a temperature between 220 and 260° F., further impregnating the pellets to incorporate 0.2 to 5% of a metal selected from the class consisting of platinum, palladium and mixtures thereof, drying the impregnated pellets at a temperature between 220 and 260° F., and air-calcining the pellets.

References Cited by the Examiner

UNITED STATES PATENTS

| | | | |
|---|---|---|---|
| 2,785,209 | 3/1957 | Schmetterling et al. | 260—673.5 |
| 2,941,016 | 6/1960 | Schmetterling et al. | 260—673.5 |
| 3,002,035 | 9/1961 | Hieronymus | 260—673.5 |
| 3,002,036 | 9/1961 | Hieronymus | 260—673.5 |
| 3,023,254 | 2/1962 | Othmer et al. | 260—673.5 |
| 3,179,602 | 4/1965 | Gremillion | 260—673.5 |

ALPHONSO D. SULLIVAN, *Primary Examiner.*